(12) United States Patent
Ait-Ameur et al.

(10) Patent No.: US 8,296,448 B2
(45) Date of Patent: Oct. 23, 2012

(54) INTERNET PROTOCOL MULTIMEDIA SYSTEM (IMS) MOBILE SESSION INITIATION PROTOCOL (SIP) AGENT

(75) Inventors: Samir Ait-Ameur, Fremont, CA (US); Emerando M. Delos Reyes, Pleasant Hill, CA (US); Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 598 days.

(21) Appl. No.: 12/546,979

(22) Filed: Aug. 25, 2009

(65) Prior Publication Data

US 2011/0051712 A1    Mar. 3, 2011

(51) Int. Cl.
*G06F 13/00* (2006.01)

(52) U.S. Cl. .......... 709/228; 709/219; 709/225

(58) Field of Classification Search .......... 709/217, 709/219, 223, 225, 227, 228, 250
See application file for complete search history.

(56) References Cited

U.S. PATENT DOCUMENTS

| | | | |
|---|---|---|---|
| 7,512,090 B2 * | 3/2009 | Benitez Pelaez et al. | 370/328 |
| 7,764,779 B2 * | 7/2010 | Peters et al. | 379/265.01 |
| 7,856,094 B2 * | 12/2010 | Khadri et al. | 379/219 |
| 2008/0304495 A1 * | 12/2008 | Jackson et al. | 370/401 |
| 2009/0172138 A1 * | 7/2009 | Wang et al. | 709/223 |
| 2009/0238174 A1 * | 9/2009 | Veenstra et al. | 370/352 |

* cited by examiner

*Primary Examiner* — Viet Vu

(57) ABSTRACT

A first phone obtains an identifier of a second phone from a phone list, and sends a request for the second phone's Session Initiation Protocol (SIP) type to a remote server. The first phone receives the second phone's SIP type from the remote server, and sends a message to one or more nodes in a network, based on the received second phone's SIP type, for a SIP session between the first phone and the second phone.

17 Claims, 8 Drawing Sheets

PHONE SIP TYPE TABLE 300

| PHONE 315 | SIP TYPE 320 | SIP TYPE STATUS 325 |
|---|---|---|
| 925-xxx-xxxx | SIP-T | CURRENT |
| 510-xxx-xxxx | SIP-I | CURRENT |
| 201-xxx-xxxx | SIP-LMSD | UPDATED |
| 908-xxx-xxxx | SIP STANDARD | NEW |
| ... | ... | ... |

ENTRIES 310

FIG. 3

INTERNET PROTOCOL MULTIMEDIA SYSTEM (IMS) MOBILE SESSION INITIATION PROTOCOL (SIP) AGENT

BACKGROUND

The Internet Protocol (IP) multimedia subsystem (IMS), defined by the 3rd Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions with one or more participants.

Various proprietary formats, outside of standard SIP, currently exist in SIP. Examples of such SIP formats include SIP-T (SIP for Telephones), SIP-LMSD (SIP-Legacy Mobile Station Domain), and SIP-I (SIP with encapsulated ISUP (Integrated Services Digital Network User Part)).

BRIEF DESCRIPTION OF THE DRAWINGS

FIG. 3 is a diagram of an exemplary phone SIP type table that may be stored in a memory of the calling UE of FIG. 1A;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Existing IMS SIP session set-up with a Public Switched Telephone Network (PSTN), a non-IMS network, or a Transcoder Free Operation (TrFO) network requires translation of the originating IMS SIP caller from its original SIP format to a different one corresponding to the SIP version accepted by the called party. For example, an IMS SIP client that uses the standard SIP format would need to translate its originating standard SIP format into a SIP-LMSD based format if the target SIP client understands only SIP-LMSD. Current system solutions that translate between different SIP formats employ proxy servers or session border controllers to build the correct SIP header format that is exchanged between different vendor MSC platforms and operator networks. Such solutions require more hardware and system resources per proxy server allocated to this translation process between multiple SIP formats. Such solutions can become more costly and inefficient when dealing with very large wireless networks.

Exemplary embodiments described herein may remove the translation between multiple SIP formats from the SIP proxy server and allocate the translation to IMS handsets housing a SIP agent. These IMS handsets may decentralize the SIP format translation from the wireless network and, thus, may manage their own phone list, and the translation of telephone numbers with distinct SIP protocol formats. Each IMS SIP agent may maintain the type of SIP format and corresponding status of each telephone number in the associated handset's contact list. When dialing a phone number, the IMS handset described herein may construct the corresponding SIP header format for the dialed phone number prior to issuing the SIP session invite, and then may send the constructed SIP header format to the proxy server, which proceeds with the SIP session set-up without having to perform the translation between the originating SIP format and the SIP format of the called phone. The IMS SIP agent of the IMS handset may use an external SIP Network Master System (NMS) to keep the handset's telephone numbers' list correctly updated with the correct type of SIP format.

Figure 1A:
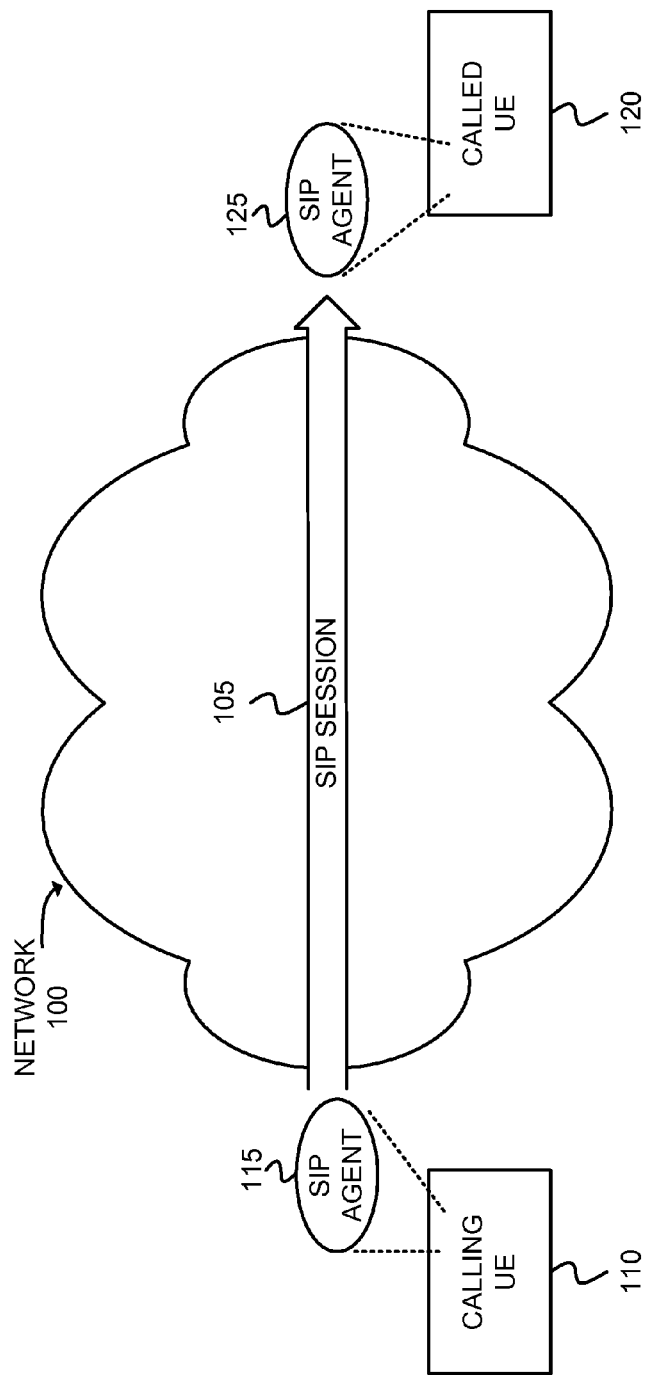
FIG. 1A is a diagram of a network, in which a SIP session may be established between two user equipments, according to an exemplary implementation.

FIG. 1A is a diagram of a network 100 in which a SIP session 105 may be established between two user equipments (UEs). As shown in FIG. 1, a calling UE 110 and a called UE 120 may be connected to network 100. Calling UE 110 and called UE 120 may, for example, be connected to network 100 via wired or wireless links. As further shown in FIG. 1A, SIP session 105 may be established between calling UE 110, having a resident SIP agent 115, and called UE 120 having a resident SIP agent 125. SIP agents 120 and 125 may be implemented in hardware and/or a combination of hardware and software in UEs 110 and 120.

UEs 110 and 115 may include computers or wireless devices. The computers may include, for example, wired laptop or desktop computers. The wireless devices may include wireless computers, wireless telephones, or personal digital assistants (PDAs)). UEs 110 and 115 may alternatively be called "handsets" or "phones" herein.

Network 100 may include one or more networks of any type. Network 100 may include one or more wireline-based networks, such as, for example, a local area network (LAN), a wide area network (WAN), a metropolitan area network (MAN), an intranet, and/or the Internet. Network 100 may further include one or more wireless-based networks, such as, for example, a wireless satellite network and/or a wireless public land mobile network (PLMN). Network 100 may implement IP-based telephony and multimedia services.

Figure 1B:
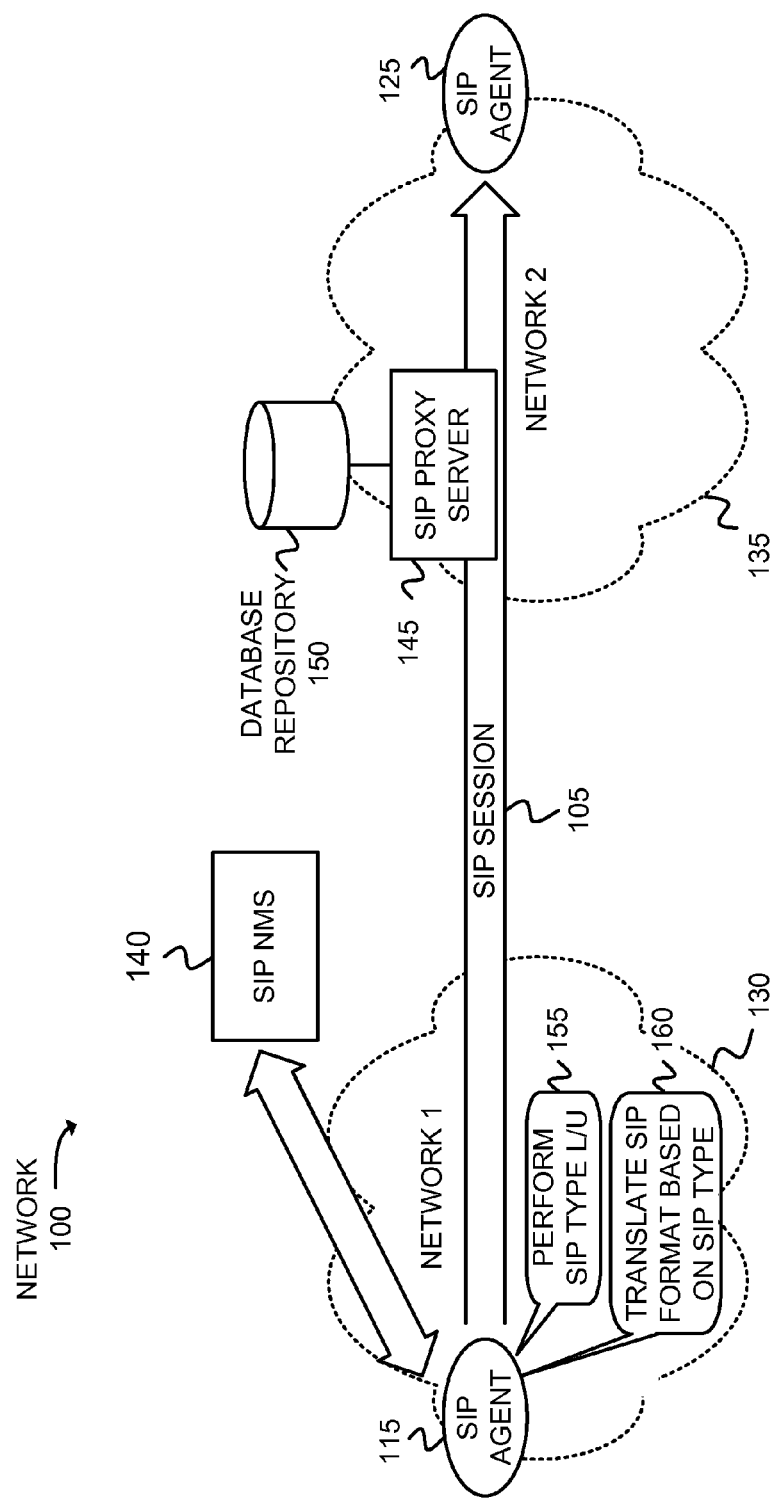
FIG. 1B is a diagram that depicts further details of the network of FIG. 1A.

FIG. 1B is a diagram that depicts further details of network 100. As shown in FIG. 1B, network 100 may include multiple sub-networks, such as network 1 130 and network 2 135, a SIP network master system (SIP NMS) 140, a SIP proxy server 145, and a database repository 150.

Network 1 130 may implement a first type of SIP protocol (e.g., SIP standard, SIP-T, SIP-I, SIP-LMSD, etc.) and network 2 135 may implement a second type of SIP protocol that is different than the SIP protocol implemented by network 1

130. For example, network 1 130 may implement SIP standard and network 2 135 may implement SIP-T.

SIP NMS 140 may contact SIP proxy servers within its network realm to update SIP types associated with phones in network 100. SIP NMS 140 may also provide a global list of SIP types for known phones to other SIP NMSs (not shown), and may further receive global lists of SIP types for phones known to other SIP NMSs from those other SIP NMSs.

SIP proxy server 145 may assist in establishing SIP session between phones (e.g., between calling UE 110 and called UE 120) in accordance with the SIP protocol. SIP proxy server 145 may further maintain records, in database repository 150, of the SIP types of phones that SIP proxy server 145 is currently serving. Upon request, SIP proxy server 145 may send SIP type information of the phones that it is serving to SIP NMS 140.

Figure 2:
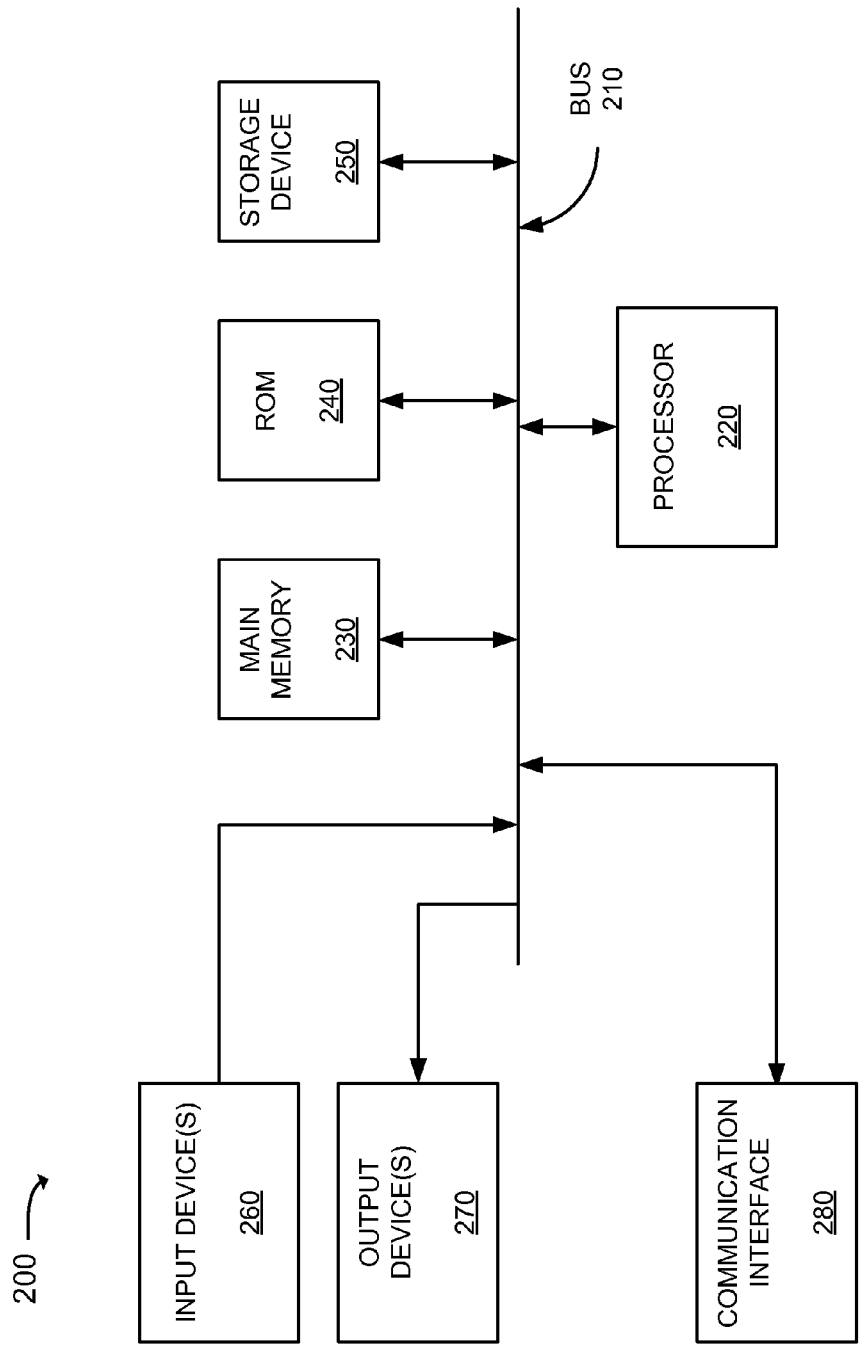
FIG. 2 is a diagram of a device, according to an exemplary implementation, that may include the user equipment, a SIP network master system (NMS), and/or a SIP proxy server of FIG. 1B.

FIG. 2 is a diagram of a device 200 according to an exemplary implementation. Device 200 may correspond to UE 110, UE 120, SIP NMS 140, and/or SIP proxy server 145. Device 200 may include a bus 210, a processor 220, a main memory 230, a read only memory (ROM) 240, a storage device 250, input device(s) 260, output device(s) 270, and a communication interface 280. Bus 210 may include a path that permits communication among the elements of device 200.

Processor 220 may include, for example, a processor, microprocessor, and/or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device(s) 260 may include one or more mechanisms that permit an operator to input information to device 200, such as a keyboard, a mouse, a pen, voice recognition and/or biometric mechanisms, etc. Output device(s) 270 may include one or more mechanisms that output information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via network 100.

Device 200 may perform certain operations or processes, as will be described in detail below. Device 200 may perform these operations in response to processor 220 executing software instructions contained in a computer-readable medium, such as memory 230. In one exemplary implementation, processor 220 may implement SIP agents 115 or 125 by executing software instructions contained in a computer-readable medium. A computer-readable medium may be defined as a physical or logical memory device. A logical memory device may include memory space within a single physical memory device or spread across multiple physical memory devices.

The software instructions may be read into memory 230 from another computer-readable medium, such as storage device 250, or from another device via communication interface 280. The software instructions contained in memory 230 may cause processor 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

FIG. 3 depicts an exemplary phone SIP type table 300 that may be stored, for example, in main memory 230, ROM 240 or storage device 250 of calling UE 110. As shown in FIG. 3, table 300 may include multiple entries 310, each of which may include a phone identifier 315, a SIP type 320 and a SIP type status 325. Phone identifier 315 may include a telephone number associated with a phone. SIP type 320 may identify a SIP protocol format (e.g. SIP standard, SIP-T, SIP-I, SIP-LMSD, etc.) used by the phone identified by phone identifier 315. SIP type status 325 may indicate a status associated with the SIP protocol format identified by SIP type 320. The status may include, for example, whether the phone was newly added (e.g., "new") to SIP type table 300, whether the SIP protocol format has been recently updated (e.g., "updated"), or whether the SIP type is current or out-of-date (e.g., "current" or "expired"). As described below with respect to FIG. 5, calling UE 110 may obtain the data stored in each entry 310 of table 300 from SIP NMS 140.

Figure 4:
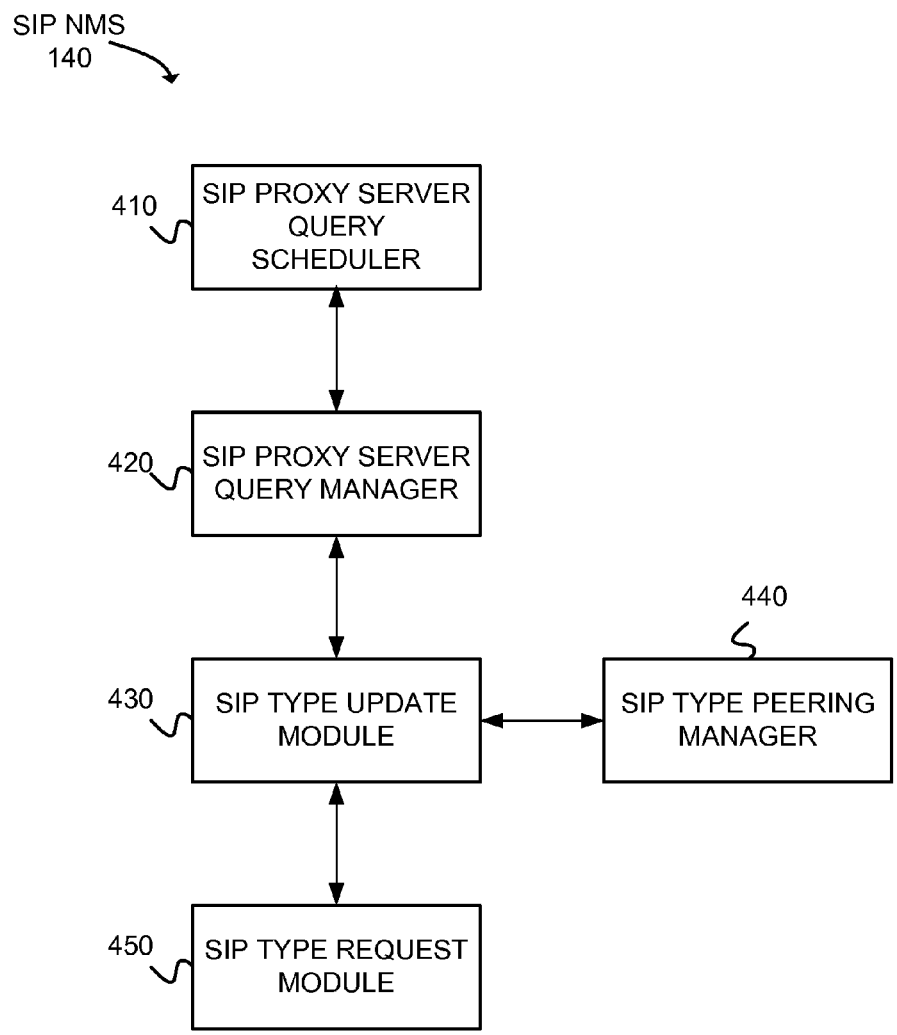
FIG. 4 is a diagram of an exemplary functional diagram of the SIP NMS of FIG. 1B.

FIG. 4 depicts an exemplary functional diagram of SIP NMS 140. SIP NMS 140 may include a SIP proxy server query scheduler 410, a SIP proxy server query manager 420, a SIP type update module 430, a SIP type peering manager 440, and a SIP type request module 450. The functions described in connection with FIG. 4 may be performed by one or more the components of device 200 (FIG. 2).

SIP proxy server query scheduler 410 may schedule SIP type status update queries to SIP proxy servers within a network realm of SIP NMS 140. SIP proxy server query scheduler 410 may submit the scheduled queries to SIP proxy server query manager 420. SIP proxy server query manager 420 may execute the scheduled queries and check for updates/changes for SIP types for phones contained in a query request. After analyzing data records from database repository 150 of SIP proxy server 145, SIP proxy server query manager 420 may submit an updated list of the SIP type and corresponding status of telephone numbers included in the query request to SIP type update module 430.

SIP type update module 430 may receive the updated list received from SIP proxy server query manager 420 and may send updated SIP types and statuses to the phones that originated the query requests. SIP type update module 430 may also construct a global list of all phones known to SIP NMS 140 and may provide the global list to SIP type peering manager 440.

SIP type peering manager 440 may interface with other SIP NMSs and provide the other SIP NMSs with SIP NMS 140's global list of SIP type and status such that SIP agent 115 may retrieve its needed SIP updates seamlessly while roaming to a different SIP NMS realm in network 100.

SIP type request module 450 may process requests from SIP agent 115 to acquire the SIP type and the status for corresponding phone numbers in SIP agent 115's telephone contact list. SIP type request module 450 may fulfill these requests for each requesting phone during off-peak network hours to avoid impacting peak air interface bandwidth usage.

Figure 5:
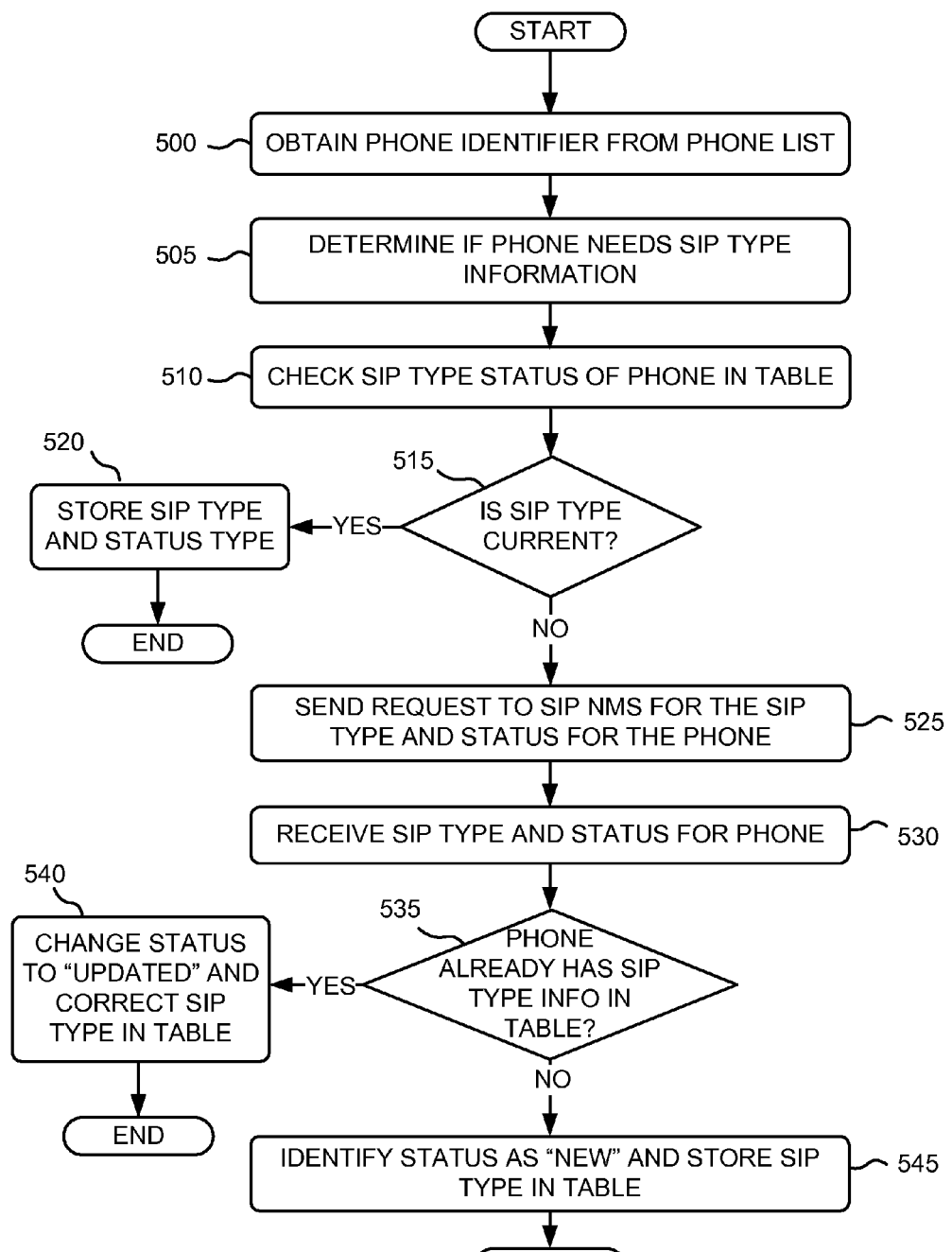
FIG. 5 is a flow diagram that illustrates an exemplary process for the SIP agent of the calling UE of FIG. 1B to obtain phone SIP type and status information associated with the called UE of FIG. 1B from the SIP NMS.

FIG. 5 is a flow diagram illustrating an exemplary process for obtaining phone SIP type and status information from SIP NMS 140 at calling UE 110. The exemplary process of FIG. 5 may be performed by processor 220 of calling UE 110, implementing SIP agent 115, possibly in conjunction with other components of calling UE 110. The exemplary process of FIG. 5 is described herein with reference to FIG. 6.

The exemplary process may begin with obtaining a phone identifier from a phone list (block 500). Calling UE 110 may store a phone contact list in main memory 230, ROM 240 and/or storage device 250. The phone contact list may list a telephone number, and other information (e.g., contact name, contact address, contact email address, etc.) associated with each phone that has previously either called UE 110, or which UE 110 has previously called.

A determination may be made if the obtained phone needs SIP type information (block 505). Processor 220 may perform a look-up into table 300 to identify whether there is an entry that corresponds to the phone obtained in block 500. Processor 220 may, for example, attempt to match the telephone number of the phone obtained in block 500 with each phone identifier field 315 contained in table 300.

Figure 6:
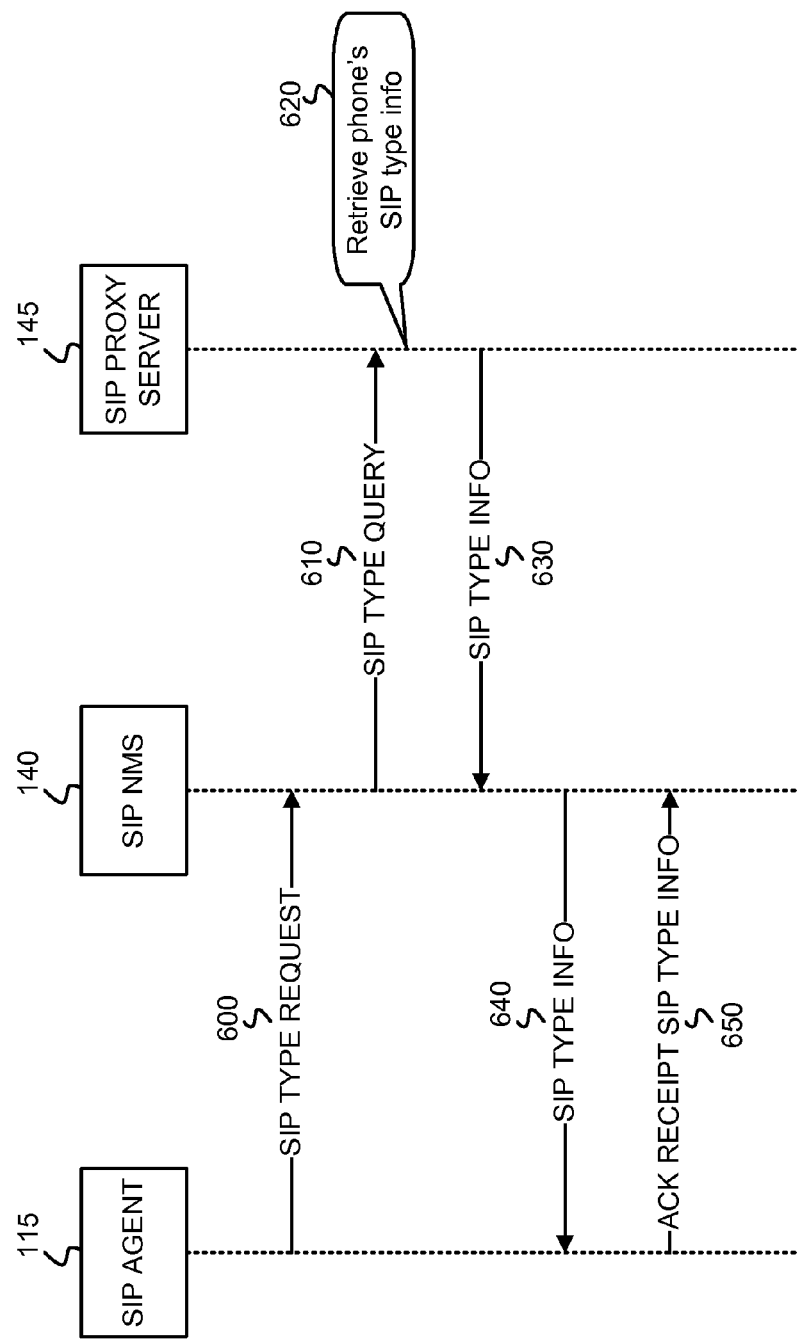
FIG. 6 depicts an exemplary messaging diagram associated with messages sent between the calling UE, SIP NMS and SIP proxy server of FIG. 1B.

A SIP type status of the phone in table 300 may be checked (block 510). Processor 220 may perform a look-up into table 300 to retrieve the data stored in SIP type status field 325 of entry 310 that corresponds to the phone obtained in block 500. A determination may be made whether the SIP type for the phone is current (block 515). Processor 220 may determine if the data retrieved from SIP type status field 325 indicates that the SIP type for the phone is "current" or "expired." If the SIP type status is current (YES—block 515), then the phone's SIP type and status type may be stored (block 520). For example, processor 220 may re-store the SIP type and SIP type status in the phone's entry 310 in table 300. If the SIP type status is not current (i.e., expired) (NO—block 515), then a request may be sent to SIP NMS 140 for the SIP type and status for the phone (block 525). SIP agent 115 may send a request, via network 100, to SIP NMS 140. FIG. 6 depicts SIP agent 115 sending a SIP type request 600 to SIP NMS 140. In response to receipt of SIP type request 600, SIP NMS 140 may send a SIP type query 610 to SIP proxy server 145. Upon receipt of SIP type query 610, SIP proxy server 145 may retrieve 620 the phone's SIP type information from database repository 150. SIP proxy server 145 may then return the retrieved SIP type information 630 to SIP NMS 140. SIP NMS 140 may send SIP type information 640, corresponding to SIP type information 630, to SIP agent 115.

The SIP type and status for the phone may be received (block 530). As depicted in FIG. 6, SIP agent 115 may receive SIP type information 640 from SIP NMS 140, and may then return an acknowledgement message 650 to SIP NMS 140 that acknowledges receipt of the SIP type information. A determination may be made whether the phone already has SIP type information in table 300 (block 535). SIP agent 115 may perform a look-up into table 300 to identify if table 300 already stores SIP type information in SIP type field 320 in entry 310 that corresponds to the phone. If table 300 already stores SIP type information for the phone (YES—block 535), then the phone's status may be changed to "updated" and the correct SIP type may be stored in table 300 (block 540). SIP agent 115 may correct the SIP type information stored in SIP type field 320 of the phone's entry 310 in table 300 using the SIP type information received in block 530.

If the phone does not already have SIP type information in table 300 (NO—block 535), then the phone's status may be identified as "new" and the phone's SIP type information may be stored in table 300 (block 545). SIP agent 115 may add a new entry 310 for the phone in table 300, may store the status "new" in SIP type status field 325 and may further store the phone's SIP type in SIP type field 320 of the new entry 310.

The exemplary process of FIG. 5 may be selectively repeated for each phone contained in calling UE 115's phone contact list. The exemplary process of FIG. 5 may be repeated periodically for each phone in the phone contact list, or may be repeated upon the occurrence of a specific event (e.g., upon a command from SIP NMS 140, or from a user of calling UE 115). The exemplary process of FIG. 5, therefore, may enable maintenance of an updated list of SIP types for each phone in calling UE 115's phone contact list such that SIP agent 115 may establish a SIP session with any phone in the phone contact list at any time.

Figure 7:
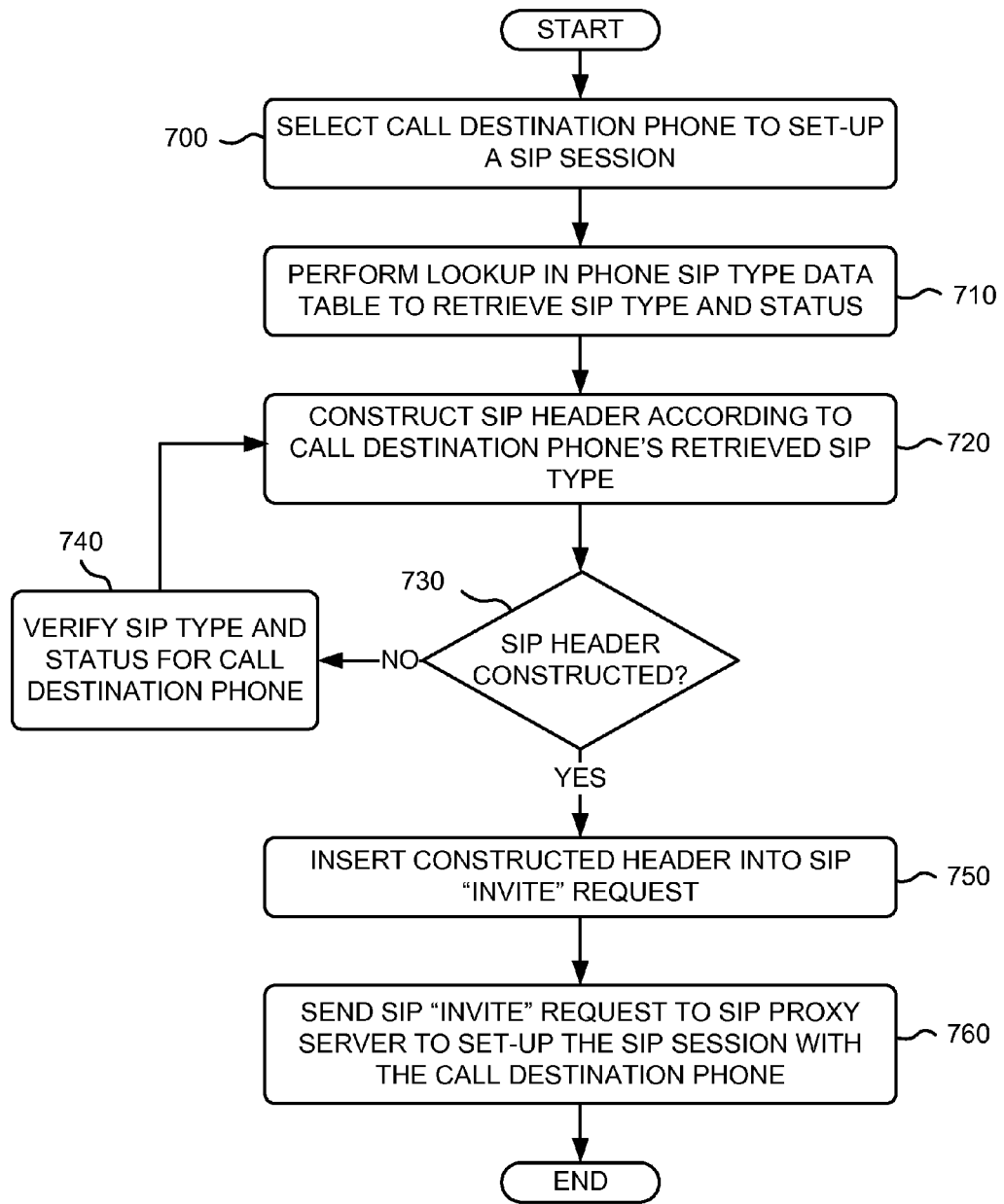
FIG. 7 is a flow diagram that illustrates an exemplary process for constructing a SIP header according to the specific SIP type associated with a call destination phone and using the constructed SIP header to send a SIP message to the SIP proxy server for setting-up a SIP session.

FIG. 7 is a flow diagram illustrating an exemplary process for constructing a SIP header according to the specific SIP type associated with a call destination phone and using the constructed SIP header to send a SIP message to the SIP proxy server for setting-up a SIP session. The exemplary process of FIG. 7 may be performed by processor 220 of calling UE 110, implementing SIP agent 115, possibly in conjunction with other components of calling UE 110.

The exemplary process may begin with the selection of a call destination phone to set-up a SIP session (block 700). A user may enter/select a telephone number of a call destination phone that the user desires to call. For example, the user may enter the telephone number via input device 260. Alternatively, the user may select the telephone number from a phone contact list stored in main memory 230, ROM 240 or storage device 250 of calling UE 115.

A lookup may be performed in phone SIP type data table 300 to retrieve the call destination phone's SIP type and status (block 710). Processor 220 may perform a look-up into table 300, by indexing table 300 with the call destination's telephone number, to retrieve data from SIP type field 320 and SIP type status field 325 of the call destination phone's entry 310 in table 300.

A SIP header may be constructed according to the call destination phone's retrieved SIP type (block 720). A SIP header format, which corresponds to the retrieved SIP type, may be used when constructing the SIP message header. Each different SIP type (e.g., SIP standard, SIP-T, SIP-I, SIP-LMSD) may have a different SIP header format and/or header content. SIP agent 115 may select the proper SIP header format for the retrieved SIP type.

It may be determined if the SIP header was constructed (block 730). If a failure occurred during SIP header construction (e.g., software execution failure, etc.), then the SIP header construction may prematurely abort. If the SIP header construction did not complete (NO—block 730), then the SIP type and status for the call destination phone may be verified (block 740) and the exemplary process may return to block 720. The call destination phone verification may involve a similar table look-up to that performed in block 710 above.

If the SIP header construction did complete (YES—block 730), then the constructed header may be inserted into a SIP "Invite" request message (block 750). An "invite" message may include a SIP message that requests a SIP session with a destination device. The SIP "Invite" request message may be sent to SIP proxy server 145 to set-up the SIP session with the call destination phone (block 760). Upon receipt of the SIP "invite" message, proxy server 145, in conjunction with SIP agent 115 and SIP agent 125, may establish SIP session 105 between calling UE 115 and called UE 120.

Exemplary embodiments described herein may enable a calling phone to translate SIP messages from one SIP format to another, different SIP format using a locally stored SIP type table. The locally stored table may maintain and update SIP types associated with other call destination phones contained in a telephone contact list.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5 and 7, the order of the blocks may be modified in other implementations consistent with the principles of the invention. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method implemented in a calling phone, comprising:
    determining, by a processor of the calling phone, a call destination phone;
    determining, by the processor, a session initiation protocol (SIP) type associated with the call destination phone from a local memory of the calling phone, where the SIP type associated with the call destination phone comprises one SIP type of multiple different SIP types;
    constructing, by the processor, a SIP header according to the determined SIP type associated with the call destination phone;
    inserting, by the processor, the constructed SIP header into a SIP message; and
    sending, by the processor, the SIP message to one or more SIP nodes in a network for a SIP session between the calling phone and the call destination phone.

2. The method of claim 1, where the one or more SIP nodes comprise a SIP proxy server and where sending the SIP message comprises:
    sending the SIP message to the SIP proxy server for setting-up the SIP session between the calling phone and the call destination phone.

3. The method of claim 1, where the SIP type associated with the call destination phone includes one of: SIP-T (SIP for Telephones), SIP-LMSD (SIP-Legacy Mobile Station Domain), SIP-I (SIP with encapsulated ISUP (Integrated Services Digital Network User Part)) or SIP standard.

4. The method of claim 1, where constructing the SIP header comprises:
    constructing the SIP header using a header format that corresponds to the SIP type associated with the call destination phone.

5. The method of claim 1, where determining a SIP type associated with the call destination phone comprises:
    indexing a table stored in the local memory with a telephone number of the call destination phone to retrieve a SIP type associated with the call destination phone.

6. The method of claim 2, where the SIP message comprises a SIP invite message.

7. A user equipment (UE) device, comprising:
    a memory to store a data table; and
    a processor to:
        determine a call destination device,
        index the data table with a telephone number of the call destination device to retrieve a session initiation protocol (SIP) type associated with the call destination device,
        construct a SIP header according to the retrieved SIP type,
        insert the constructed SIP header into a SIP message, and
        initiate sending of the SIP message to one or more SIP nodes in a network for a SIP session between the calling phone and the call destination phone.

8. The UE device of claim 7, where the one or more SIP nodes comprise a SIP proxy server and where the processor is further to:
    send the SIP message to the SIP proxy server for setting up the SIP session between the UE device and the call destination device.

9. The UE device of claim 7, where the SIP type associated with the call destination device includes one of: SIP-T (SIP for Telephones), SIP-LMSD (SIP-Legacy Mobile Station Domain), SIP-I (SIP with encapsulated ISUP (Integrated Services Digital Network User Part)) or SIP standard.

10. The UE device of claim 7, where, when constructing the SIP header, the processor is further to:
    construct the SIP header using a header format that corresponds to the retrieved SIP type.

11. The UE device of claim 8, where the SIP message comprises a SIP invite message.

12. A computer-readable medium containing instructions executable by at least one processor, the computer-readable medium comprising:
    one or more instructions for receiving a selection of a call between a calling phone and a call destination phone;
    one or more instructions for obtaining a session initiation protocol (SIP) type associated with the call destination phone from a local memory of the calling phone, where the SIP type associated with the call destination phone comprises one SIP type of multiple different SIP types;
    one or more instructions for constructing a SIP header according to the obtained SIP type associated with the call destination phone;
    one or more instructions for inserting the constructed SIP header into a SIP message; and
    one or more instructions for sending the SIP message to a SIP proxy server for setting-up a SIP session between the calling phone and the call destination phone.

13. A first phone, comprising:
    a memory to store a phone list;
    a communication interface; and
    a processor to:
        obtain an identifier associated with a second phone from the phone list,
        send, via the communication interface and to a remote server, a request for a Session Initiation Protocol (SIP) type associated with the second phone, where the SIP type associated with the second phone comprises one of: SIP-T (SIP for Telephones), SIP-LMSD (SIP-Legacy Mobile Station Domain), SIP-I (SIP with encapsulated ISUP (Integrated Services Digital Network User Part)) or SIP standard, receive, via the communication interface and from the remote server, SIP type associated with the second phone, and send, via the communication interface, a message to one or more nodes in a network, based on the SIP type associated with the second phone, for a SIP session between the first phone and the second phone.

14. The first phone of claim 13, where the one or more nodes comprise a SIP proxy server and where, the processor is further to:

send the message to the SIP proxy server for setting up the SIP session between the first phone and the second phone.

15. The first phone of claim 13, where the processor is further to:

construct a SIP header according to the received SIP type, and insert the constructed SIP header into the message prior to sending to the one or more nodes in the network.

16. The first phone of claim 13, where the phone list comprises a telephone contact list.

17. A computer-readable medium containing instructions executable by at least one processor, the computer-readable medium comprising:

one or more instructions for obtaining an identifier associated with a second phone from a telephone contact list stored at a first phone;

one or more instructions for sending a request for the Session Initiation Protocol (SIP) type associated with the second phone to a remote server, where the SIP type associated with the second phone comprises one of: SIP-T (SIP for Telephones), SIP-LMSD (SIP-Legacy Mobile Station Domain), SIP-I (SIP with encapsulated ISUP (Integrated Services Digital Network User Part)) or SIP standard;

one or more instructions for receiving the SIP type associated with the second phone from the remote server; and one or more instructions for sending a message to a SIP proxy server, based on the received SIP type, for setting up a SIP session between the first phone and the second phone.

* * * * *